United States Patent
Gao et al.

(10) Patent No.: US 10,529,053 B2
(45) Date of Patent: Jan. 7, 2020

(54) ADAPTIVE PIXEL UNIFORMITY COMPENSATION FOR DISPLAY PANELS

(71) Applicant: Apple Inc., Cupertino, CA (US)

(72) Inventors: Shengkui Gao, San Jose, CA (US); Hung Sheng Lin, San Jose, CA (US); Hyunsoo Kim, Stanford, CA (US); Hyunwoo Nho, Stanford, CA (US); Katherine W. Song, Cupertino, CA (US); Mohammad Hajirostam, San Jose, CA (US); Myung-Je Cho, San Jose, CA (US); Rui Zhang, Sunnyvale, CA (US); Sang Y. Youn, Cupertino, CA (US); Wei H. Yao, Palo Alto, CA (US); Yafei Bi, Los Altos Hills, CA (US)

(73) Assignee: Apple Inc., Cupertino, CA (US)

( * ) Notice: Subject to any disclaimer, the term of this patent is extended or adjusted under 35 U.S.C. 154(b) by 127 days.

(21) Appl. No.: 15/711,831

(22) Filed: Sep. 21, 2017

(65) Prior Publication Data

US 2018/0158173 A1 Jun. 7, 2018

Related U.S. Application Data

(60) Provisional application No. 62/429,434, filed on Dec. 2, 2016.

(51) Int. Cl.
| | |
|---|---|
| *G06T 3/40* | (2006.01) |
| *G06T 7/90* | (2017.01) |
| *G06T 7/00* | (2017.01) |
| *G06T 5/00* | (2006.01) |

(52) U.S. Cl.
CPC ............... *G06T 3/40* (2013.01); *G06T 5/001* (2013.01); *G06T 7/0002* (2013.01); *G06T 7/90* (2017.01)

(58) Field of Classification Search
None
See application file for complete search history.

(56) References Cited

U.S. PATENT DOCUMENTS

| | | | |
|---|---|---|---|
| 6,760,471 B1 * | 7/2004 | Raymond | G01N 21/8806 348/126 |
| 7,684,634 B2 | 3/2010 | Kilgore | |
| 7,773,062 B2 | 8/2010 | Cok et al. | |
| 9,143,709 B1 | 9/2015 | Winn | |
| 2008/0136763 A1 * | 6/2008 | Ohashi | G09G 3/3611 345/89 |
| 2014/0369622 A1 * | 12/2014 | He | G06T 5/005 382/266 |

(Continued)

*Primary Examiner* — Kevin Ky
(74) *Attorney, Agent, or Firm* — Fletcher Yoder, P.C.

(57) ABSTRACT

A display device may include a display having a pixels and a processor. The processor may receive image data, determine a digital offset value for a pixel based on a location of the pixel, such that the digital offset value compensates for one or more non-uniformity properties of the pixel. The processor may determine a scale factor associated with the pixel based on at least two of a luminance setting for the display, a driving mode of the display, and a gray level value for the pixel. The processor may then generate correction image data by applying the scale factor to the digital offset value, generate compensated image data based on the correction image data and the image data, and provide the compensated image data to the display.

15 Claims, 8 Drawing Sheets

(56) References Cited

U.S. PATENT DOCUMENTS

2015/0036946 A1\* 2/2015 Haik ................. G06T 5/002
 382/274
2016/0269704 A1\* 9/2016 Ohta ................. H04N 9/646

\* cited by examiner

ADAPTIVE PIXEL UNIFORMITY COMPENSATION FOR DISPLAY PANELS

CROSS-REFERENCE TO RELATED APPLICATION

This application claims priority to and benefit from U.S. Provisional Application No. 62/429,434, filed Dec. 2, 2016, entitled "Adaptive Pixel Uniformity Compensation for Display Panels," the contents of which is incorporated by reference in its entirety.

BACKGROUND

The present disclosure relates to systems and methods for sensing characteristics of pixels in electronic display devices to compensate for non-uniformity in luminance or color of a pixel with respect to other pixels in the electronic display device.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

As electronic displays are employed in a variety of electronic devices, such as mobile phones, televisions, tablet computing devices, and the like, manufacturers of the electronic displays continuously seek ways to improve the consistency of colors depicted on the electronic display devices. For example, given variations in manufacturing, various noise sources present within a display device, or various ambient conditions in which each display device operates, different pixels within a display device might emit a different color value or gray level even when provided with the same electrical input. It is desirable, however, for the pixels to uniformly depict the same color or gray level when the pixels programmed to do so to avoid visual display artifacts due to inconsistent color.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In certain electronic display devices, light-emitting diodes such as organic light-emitting diodes (OLEDs), micro-LEDs (μLEDs), or active matrix organic light-emitting diodes (AMOLEDs) may be employed as pixels to depict a range of gray levels for display. However, due to various properties associated with the manufacturing of the display, the driving scheme of these pixels within the display device, and other characteristics related to the display panel, a particular gray level output by one pixel in a display device may be different from a gray level output by another pixel in the same display device upon receiving the same electrical input. As such, the digital values used to generate these gray levels for various pixels may be compensated to account for these differences based on certain characteristics of the display panel. For instance, a digital compensation value for a gray level to be output by a pixel may be determined based on optical wave or electrical wave testing performed on the display during the manufacturing phase of the display. Based on the results of this testing, a compensation lookup table (LUT) may be generated for various gray levels at one or more luminance settings for each pixel of the display to provide improved pixel uniformity across the display.

In addition, in some embodiments, each digital compensation value may be scaled by a respective scaling factor based on information from a gamma block associated with the display. The scaled digital compensation value may then be applied to the original digital pixel data of the image data to be displayed. As a result, the pixels of the display may be compensated to depict image data more uniformly across the display. That is, the present disclosure details various systems and methods that may be employed to adaptively compensate the pixel data of input image data, such that the luminance and color (e.g., gray level) properties depicted by each pixel of the display are consistent with each other. In other words, the presently disclosed embodiments may compensate for the variations in the pixel properties to achieve a more uniform image that will be depicted on the display device.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Organic light-emitting diode (e.g., OLED, AMOLED) display panels provide opportunities to make thin, flexible, high-contrast, and color-rich electronic displays. Generally, OLED display devices are current driven devices and use thin film transistors (TFTs) as current sources to provide certain amount of current to generate a certain level of luminance to a respective pixel electrode. OLED luminance to current ratio is generally represented as OLED efficiency with units: cd/A (Luminance/Current Density or $(cd/m^2)/(A/m^2)$). Each respective TFT, which provides current to a respective pixel, may be controlled by gate to source voltage ($V_{gs}$), which is stored on a capacitor ($C_{st}$) electrically coupled to the LED of the pixel.

Generally, the application of the gate-to-source voltage $V_{gs}$ on the capacitor $C_{st}$ is performed by programming voltage on a corresponding data line to be provided to a respective pixel. However, when providing the voltage on a data line, several sources of noise or variation in the OLED-TFT system can result in either localized (e.g., in-panel) or global (e.g., panel to panel) non-uniformity in luminance or color. Variations in the TFT system may be addressed in a number of ways. For instance, in one embodiment, pixel performance (e.g., output luminance/brightness) may be tested at certain times (e.g., during manufacturing of the display) to determine how each pixel of a display responds to different electrical inputs (e.g., emission current provided to pixel). By way of example, the pixels of a display may be provided electrical inputs to cause the pixels to depict various gray levels. The luminance value output by each pixel, when each pixel is provided with the same electrical input, may be captured via optical testing and used to determine the luminance value differences across the pixels of the panel. These differences may then be used to generate a multi-dimensional look up table (LUT) that includes digital offset values for the pixels of the display. The digital offset values may be applied (e.g., added) to the pixel data of input image data, such that each pixel of the display each responds to the same electrical input (e.g., current or voltage) similarly.

In addition to the digital offset value, a multi-dimensional table may also be generated to provide scaling factors for each digital offset value for each pixel of the display to compensate for various non-linear properties (e.g., gamma offset) of the display. For instance, the scaling factor may be determined based on information related to gamma properties of the display. As such, the scaling factor may account for various non-linear characteristics of the display panel, such that when the scale factor is applied (e.g., multiplied) to the digital offset value, the resulting scaled digital offset value may compensate for various sources related to the non-uniform performances of pixels across the display panel. After determining the scaled digital offset value for each pixel of the input image data, the scaled digital offset value for each pixel may be added to the original input image data, thereby generating compensated image data. The compensated image data may then be provided to a timing controller or to the respective pixels of the display to depict the image of the image data. By compensating for the non-uniform luminance properties of the pixels and other non-linear properties of the pixels across the panel, the pixels used to display the resulting image may provide more uniform color and luminance properties, thereby improving the quality of the images depicted on the display. Additional details with regard to adaptively compensating pixel data for uniformity will be discussed below with reference to FIGS. 1-10.

Figure 1:
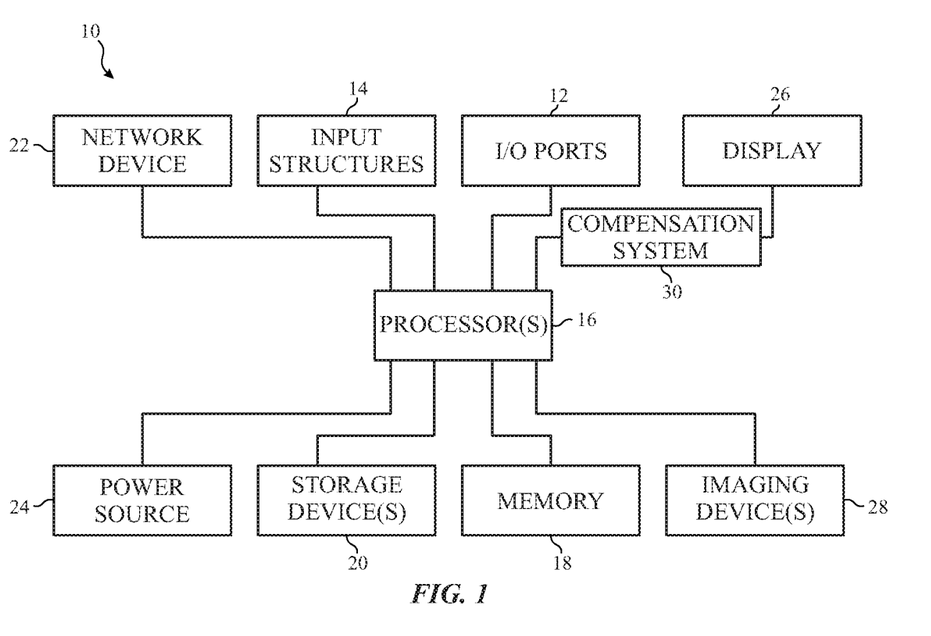
FIG. 1 is a simplified block diagram of components of an electronic device that may depict image data on a display, in accordance with embodiments described herein.

By way of introduction, FIG. 1 is a block diagram illustrating an example of an electronic device 10 that may include the sensing system mentioned above. The electronic device 10 may be any suitable electronic device, such as a laptop or desktop computer, a mobile phone, a digital media player, television, or the like. By way of example, the electronic device 10 may be a portable electronic device, such as a model of an iPod® or iPhone®, available from Apple Inc. of Cupertino, Calif. The electronic device 10 may be a desktop or notebook computer, such as a model of a MacBook®, MacBook® Pro, MacBook Air®, iMac®, Mac® Mini, or Mac Pro®, available from Apple Inc. In other embodiments, electronic device 10 may be a model of an electronic device from another manufacturer.

As shown in FIG. 1, the electronic device 10 may include various components. The functional blocks shown in FIG. 1 may represent hardware elements (including circuitry), software elements (including code stored on a computer-readable medium) or a combination of both hardware and software elements. In the example of FIG. 1, the electronic device 10 includes input/output (I/O) ports 12, input structures 14, one or more processors 16, a memory 18, non-volatile storage 20, network device 22, power source 24, display 26, and one or more imaging devices 28. It should be appreciated, however, that the components illustrated in FIG. 1 are provided only as an example. Other embodiments of the electronic device 10 may include more or fewer components. To provide one example, some embodiments of the electronic device 10 may not include the imaging device(s) 28.

Before continuing further, it should be noted that the system block diagram of the device 10 shown in FIG. 1 is intended to be a high-level control diagram depicting various components that may be included in such a device 10. That is, the connection lines between each individual component shown in FIG. 1 may not necessarily represent paths or directions through which data flows or is transmitted between various components of the device 10. Indeed, as discussed below, the depicted processor(s) 16 may, in some embodiments, include multiple processors, such as a main processor (e.g., CPU), and dedicated image and/or video processors. In such embodiments, the processing of image data may be primarily handled by these dedicated processors, thus effectively offloading such tasks from a main processor (CPU).

Considering each of the components of FIG. 1, the I/O ports 12 may represent ports to connect to a variety of devices, such as a power source, an audio output device, or other electronic devices. The input structures 14 may enable user input to the electronic device, and may include hardware keys, a touch-sensitive element of the display 26, and/or a microphone.

The processor(s) 16 may control the general operation of the device 10. For instance, the processor(s) 16 may execute an operating system, programs, user and application interfaces, and other functions of the electronic device 10. The processor(s) 16 may include one or more microprocessors and/or application-specific microprocessors (ASICs), or a combination of such processing components. For example, the processor(s) 16 may include one or more instruction set (e.g., RISC) processors, as well as graphics processors (GPU), video processors, audio processors and/or related chip sets. As may be appreciated, the processor(s) 16 may be coupled to one or more data buses for transferring data and instructions between various components of the device 10. In certain embodiments, the processor(s) 16 may provide the processing capability to execute an imaging applications on the electronic device 10, such as Photo Booth®, Aperture®, iPhoto®, Preview®, iMovie®, or Final Cut Pro® available from Apple Inc., or the "Camera" and/or "Photo" applications provided by Apple Inc. and available on some models of the iPhone®, iPod®, and iPad®.

A computer-readable medium, such as the memory 18 or the nonvolatile storage 20, may store the instructions or data to be processed by the processor(s) 16. The memory 18 may include any suitable memory device, such as random access memory (RAM) or read only memory (ROM). The nonvolatile storage 20 may include flash memory, a hard drive, or any other optical, magnetic, and/or solid-state storage media. The memory 18 and/or the nonvolatile storage 20 may store firmware, data files, image data, software programs and applications, and so forth.

The network device 22 may be a network controller or a network interface card (NIC), and may enable network communication over a local area network (LAN) (e.g., Wi-Fi), a personal area network (e.g., Bluetooth), and/or a wide area network (WAN) (e.g., a 3G or 4G data network). The power source 24 of the device 10 may include a Li-ion battery and/or a power supply unit (PSU) to draw power from an electrical outlet or an alternating-current (AC) power supply.

The display 26 may display various images generated by device 10, such as a GUI for an operating system or image data (including still images and video data). The display 26 may be any suitable type of display, such as a liquid crystal display (LCD), plasma display, or an organic light emitting diode (OLED) display, for example. In one embodiment, the display 26 may include self-emissive pixels such as organic light emitting diodes (OLEDs) or micro-light-emitting-diodes (μ-LEDs).

Additionally, as mentioned above, the display 26 may include a touch-sensitive element that may represent an input structure 14 of the electronic device 10. The imaging device(s) 28 of the electronic device 10 may represent a digital camera that may acquire both still images and video. Each imaging device 28 may include a lens and an image sensor capture and convert light into electrical signals.

In certain embodiments, the electronic device 10 may include a compensation system 30, which may include a chip, such as processor or ASIC, that may control various aspects of the display 26. It should be noted that the compensation system 30 may be implemented in the CPU, the GPU, or any suitable processing device that processes image data in the digital domain before the image data is provided to the pixel circuitry.

In certain embodiments, the compensation system 30 may compensate for non-uniform gray levels and luminance properties for each pixel of the display 26. Generally, when the same electrical signal (e.g., voltage or current) is provided to each pixel of the display 26, each pixel should depict the same gray level. However, due to various sources of noise, the same voltage being applied to a number of pixels may result in a variety of different gray levels or luminance values depicted across the number of pixels. As such, the compensation system 30 may adjust a digital value provided to each pixel to compensate for these differences via a compensation value. The compensation system 30 may then adjust the data signals provided to each pixel based on the compensation value.

Figure 2:
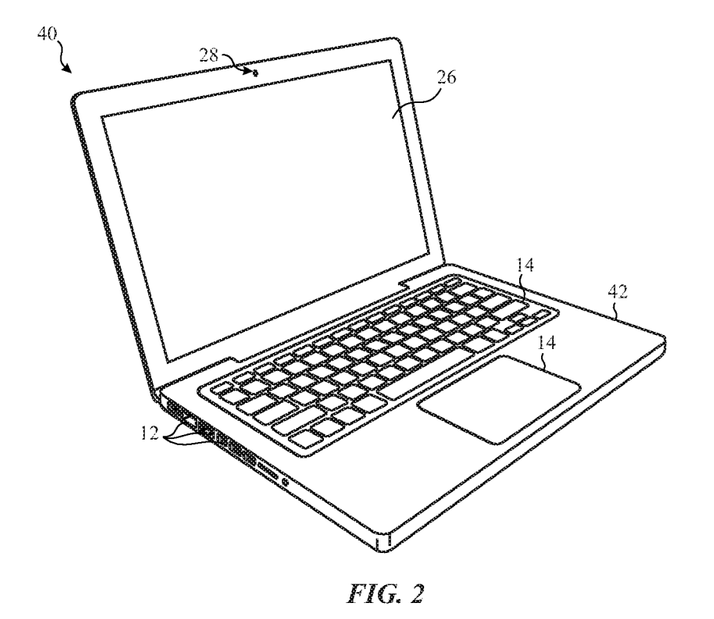
FIG. 2 is a perspective view of the electronic device of FIG. 1 in the form of a notebook computing device, in accordance with embodiments described herein.

As mentioned above, the electronic device 10 may take any number of suitable forms. Some examples of these possible forms appear in FIGS. 2-5. Turning to FIG. 2, a notebook computer 40 may include an enclosure 42, the display 26, the I/O ports 12, and the input structures 14. The input structures 14 may include a keyboard and a touchpad mouse that are integrated with the enclosure 42. Additionally, the input structure 14 may include various other buttons and/or switches which may be used to interact with the computer 40, such as to power on or start the computer, to operate a GUI or an application running on the computer 40, as well as adjust various other aspects relating to operation of the computer 40 (e.g., sound volume, display brightness, etc.). The computer 40 may also include various I/O ports 12 that provide for connectivity to additional devices, as discussed above, such as a FireWire® or USB port, a high definition multimedia interface (HDMI) port, or any other type of port that is suitable for connecting to an external device. Additionally, the computer 40 may include network connectivity (e.g., network device 22), memory (e.g., memory 18), and storage capabilities (e.g., storage device 20), as described above with respect to FIG. 1.

The notebook computer 40 may include an integrated imaging device 28 (e.g., a camera). In other embodiments, the notebook computer 40 may use an external camera (e.g., an external USB camera or a "webcam") connected to one or more of the I/O ports 12 instead of or in addition to the integrated imaging device 28. In certain embodiments, the depicted notebook computer 40 may be a model of a MacBook®, MacBook® Pro, MacBook Air®, or PowerBook® available from Apple Inc. In other embodiments, the computer 40 may be portable tablet computing device, such as a model of an iPad® from Apple Inc.

Figure 3:
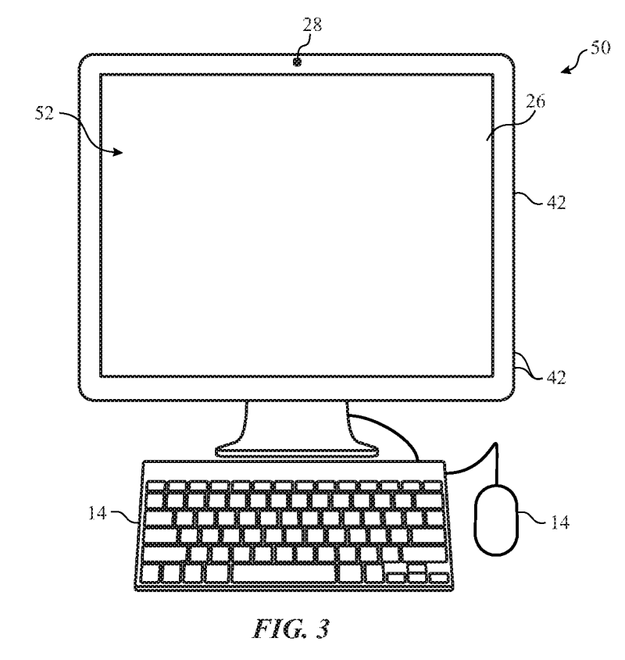
FIG. 3 is a front view of the electronic device of FIG. 1 in the form of a desktop computing device, in accordance with embodiments described herein.

FIG. 3 shows the electronic device 10 in the form of a desktop computer 50. The desktop computer 50 may include a number of features that may be generally similar to those provided by the notebook computer 40 shown in FIG. 4, but may have a generally larger overall form factor. As shown, the desktop computer 50 may be housed in an enclosure 42 that includes the display 26, as well as various other components discussed above with regard to the block diagram shown in FIG. 1. Further, the desktop computer 50 may include an external keyboard and mouse (input structures 14) that may be coupled to the computer 50 via one or more I/O ports 12 (e.g., USB) or may communicate with the computer 50 wirelessly (e.g., RF, Bluetooth, etc.). The desktop computer 50 also includes an imaging device 28, which may be an integrated or external camera, as discussed above. In certain embodiments, the depicted desktop computer 50 may be a model of an iMac®, Mac® mini, or Mac Pro®, available from Apple Inc.

Figure 4:
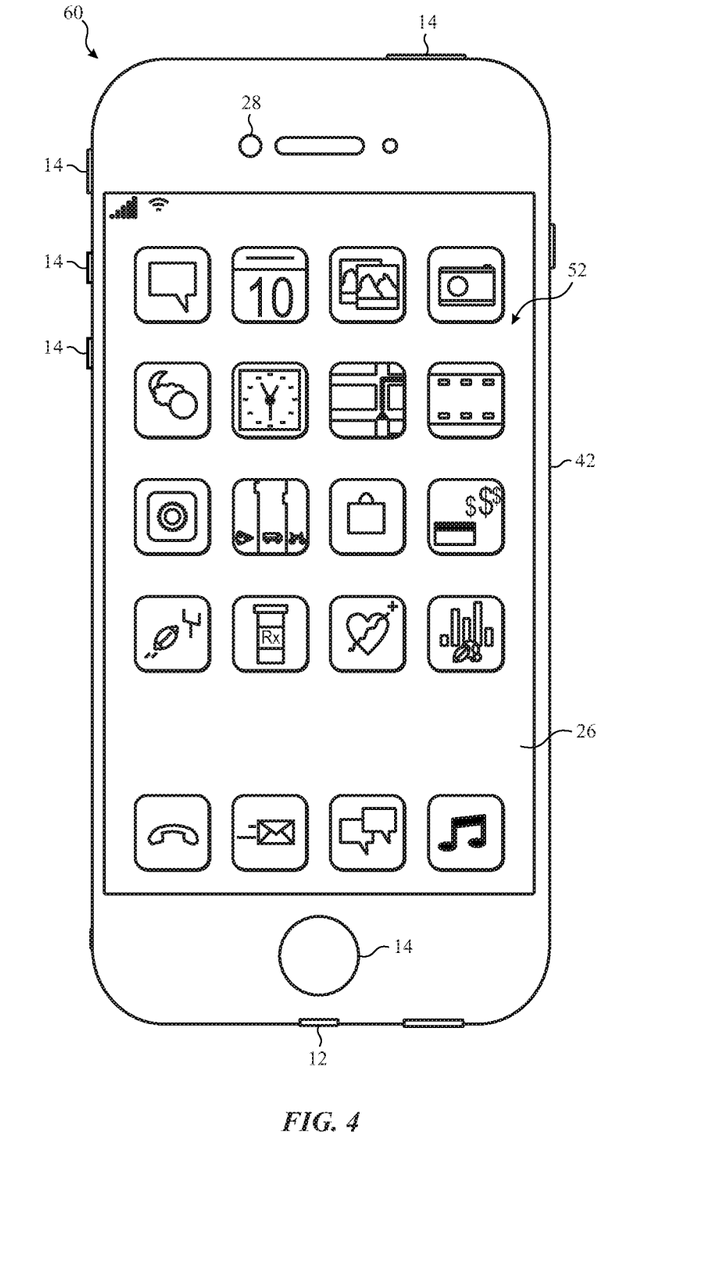
FIG. 4 is a front view of the electronic device of FIG. 1 in the form of a handheld portable electronic device, in accordance with embodiments described herein.
Figure 5:
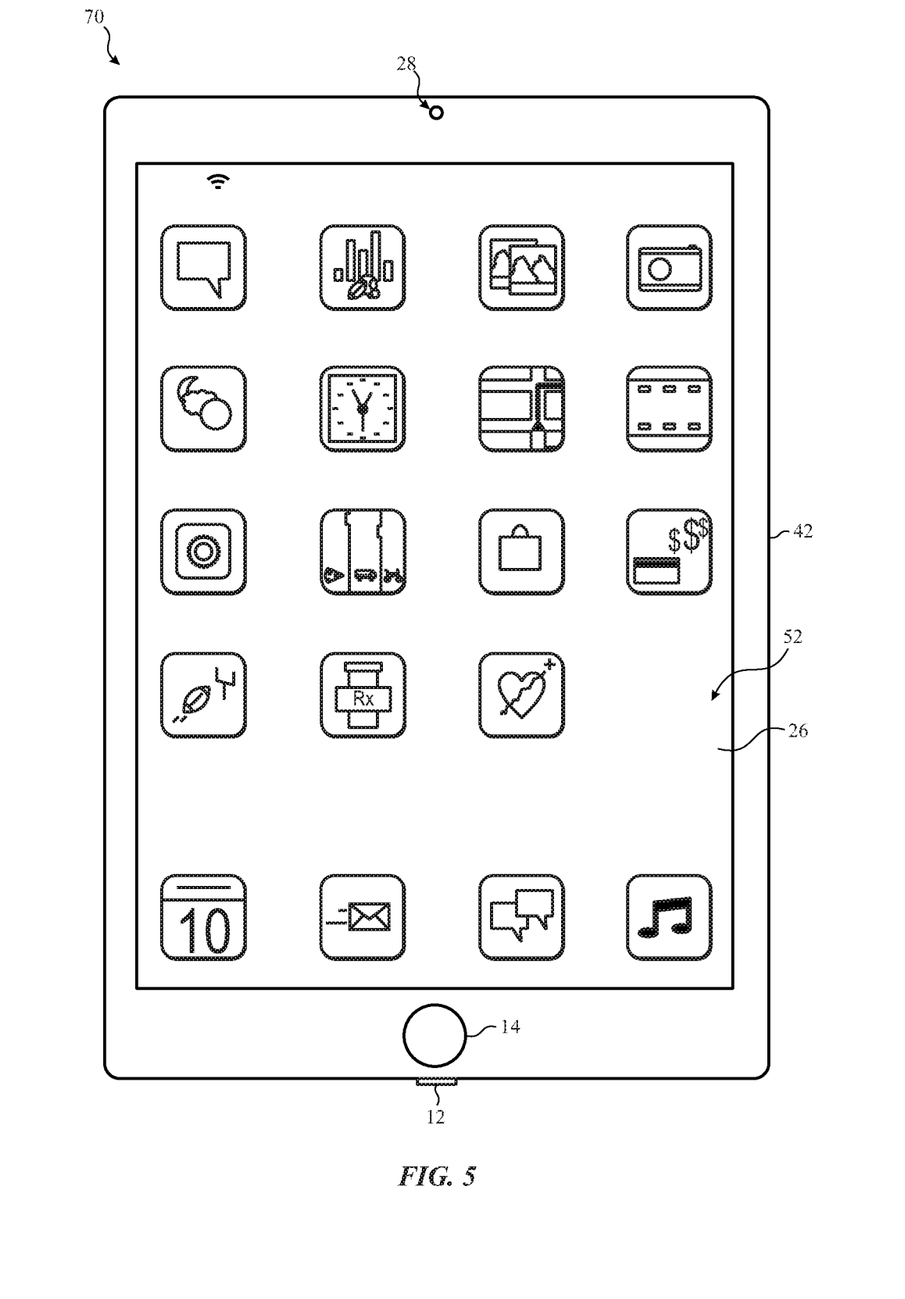
FIG. 5 is a front view of the electronic device of FIG. 1 in the form of a tablet computing device, in accordance with embodiments described herein.

The electronic device 10 may also take the form of portable handheld device 60 or 70, as shown in FIGS. 4 and 5. By way of example, the handheld device 60 or 70 may be a model of an iPod® or iPhone® available from Apple Inc. The handheld device 60 or 70 includes an enclosure 42, which may function to protect the interior components from physical damage and to shield them from electromagnetic interference. The enclosure 42 also includes various user input structures 14 through which a user may interface with the handheld device 60 or 70. Each input structure 14 may control various device functions when pressed or actuated. As shown in FIGS. 4 and 5, the handheld device 60 or 70 may also include various I/O ports 12. For instance, the depicted I/O ports 12 may include a proprietary connection port for transmitting and receiving data files or for charging a power source 24. Further, the I/O ports 12 may also be used to output voltage, current, and power to other connected devices.

The display 26 may display images generated by the handheld device 60 or 70. For example, the display 26 may display system indicators that may indicate device power status, signal strength, external device connections, and so forth. The display 26 may also display a GUI 52 that allows a user to interact with the device 60 or 70, as discussed above with reference to FIG. 3. The GUI 52 may include graphical elements, such as the icons, which may correspond to various applications that may be opened or executed upon detecting a user selection of a respective icon.

Figure 6:
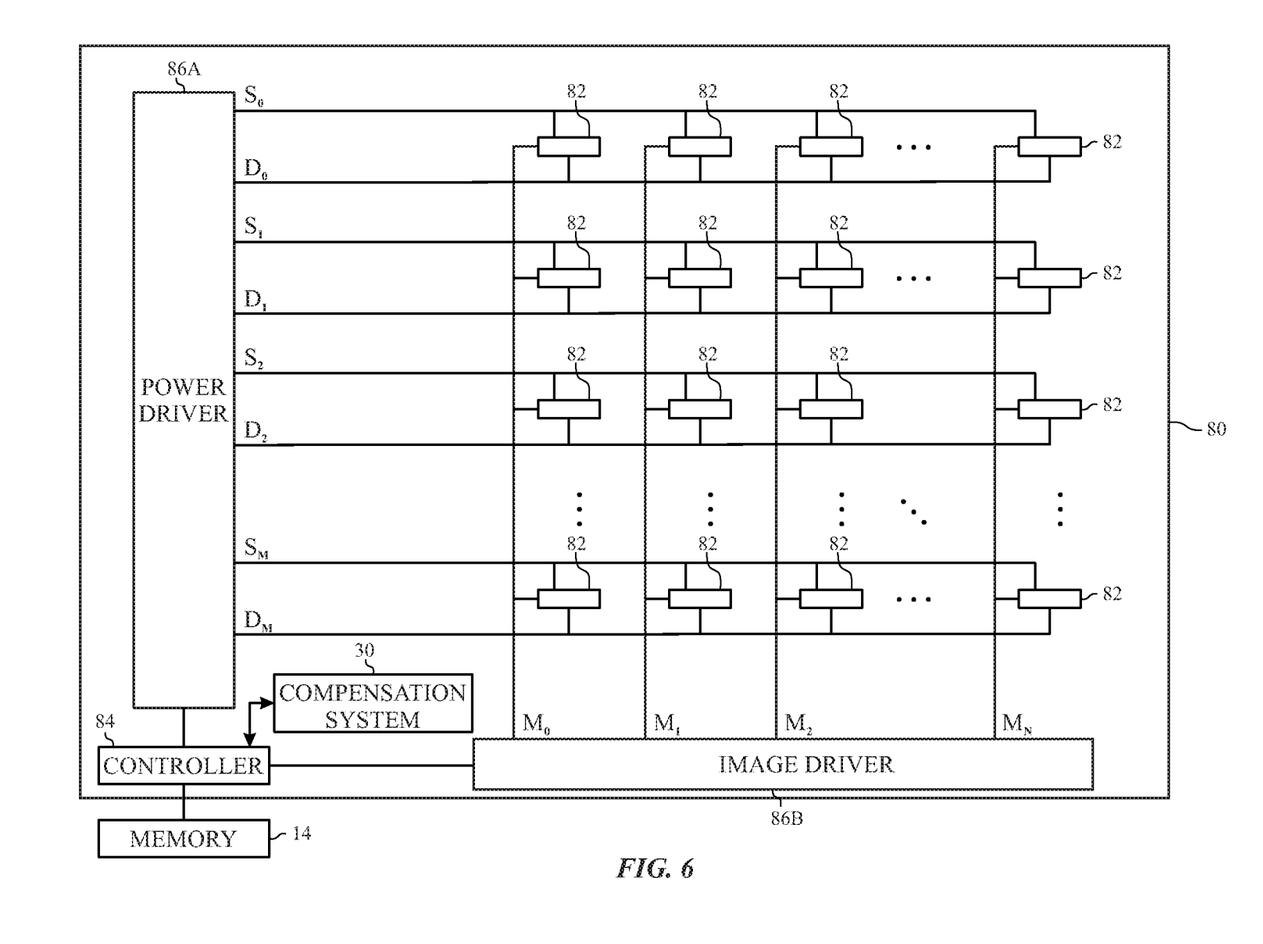
FIG. 6 is a circuit diagram of an array of self-emissive pixels of the electronic display of the electronic device of FIG. 1, in accordance with aspects of the present disclosure.

Having provided some context with regard to possible forms that the electronic device 10 may take, the present discussion will now focus on the compensation system 30 of FIG. 1. Generally, the brightness depicted by each respective pixel in the display 26 is generally controlled by varying an electric field associated with each respective pixel in the display 26. Keeping this in mind, FIG. 6 illustrates one embodiment of a circuit diagram of display 26 that may generate the electrical field that energizes each respective pixel and causes each respective pixel to emit light at an intensity corresponding to an applied voltage. As shown, display 26 may include a self-emissive pixel array 80 having an array of self-emissive pixels 82.

The self-emissive pixel array 80 is shown having a controller 84, a power driver 86A, an image driver 86B, and the array of self-emissive pixels 82. The self-emissive pixels 82 are driven by the power driver 86A and image driver 86B. Each power driver 86A and image driver 86B may drive one or more self-emissive pixels 82. In some embodiments, the power driver 86A and the image driver 86B may include multiple channels for independently driving multiple self-emissive pixels 82. The self-emissive pixels may include any suitable light-emitting elements, such as organic light emitting diodes (OLEDs), micro-light-emitting-diodes (μ-LEDs), and the like.

The power driver 86A may be connected to the self-emissive pixels 82 by way of scan lines $S_0, S_1, \ldots S_{m-1}$, and $S_m$ and driving lines $D_0, D_1, \ldots D_{m-1}$, and $D_m$. The self-emissive pixels 82 receive on/off instructions through the scan lines $S_0, S_1, S_{m-1}$, and $S_m$ and generate driving currents corresponding to data voltages transmitted from the driving lines $D_0, D_1, \ldots D_{m-1}$, and $D_m$. The driving currents are applied to each self-emissive pixel 82 to emit light according to instructions from the image driver 86B through driving lines $M_0, M_1, \ldots M_{n-1}$, and $M_n$. Both the power driver 86A and the image driver 86B transmit voltage signals through respective driving lines to operate each self-emissive pixel 82 at a state determined by the controller 84 to emit light. Each driver may supply voltage signals at a duty cycle and/or amplitude sufficient to operate each self-emissive pixel 82.

The controller 84 may control the color of the self-emissive pixels 82 using image data generated by the processor(s) 16 and stored into the memory 18 or provided directly from the processor(s) 16 to the controller 84. The compensation system 30 may provide a signal to the controller 84 to adjust the data signals transmitted to the self-emissive pixels 82, such that the self-emissive pixels 82 may depict substantially uniform color and luminance provided the same current input in accordance with the techniques that will be described in detail below.

Figure 7:
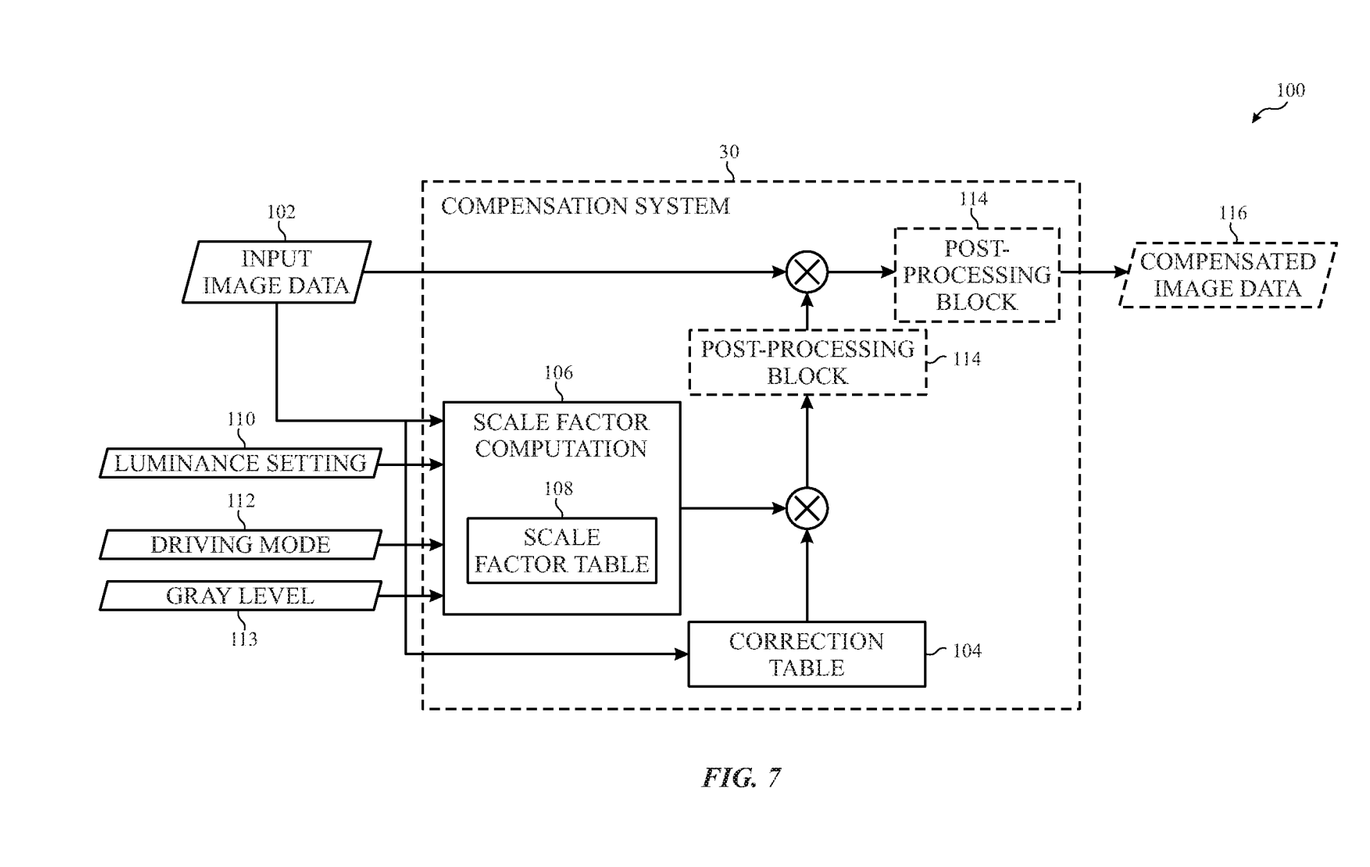
FIG. 7 is data flow diagram of a process for compensating the pixel data of input image data to provide more uniform pixel characteristics across the display of the electronic device of FIG. 1, in accordance with embodiments described herein.

With the foregoing in mind, FIG. 7 illustrates a data flow diagram 100 indicating one embodiment in which the compensation system 30 may provide compensated image data to the pixels 82. Referring now to FIG. 7, the compensation system 30 may receive input image data 102 that corresponds to desired images to be depicted on the display 26 via the pixels 82. The input image data 102 may include a digital pixel value (e.g., gray level/brightness) for each pixel 82 of the display 26.

After receiving the input image data 102, the compensation system 30 may determine a digital offset value (e.g., gray level offset value) for each pixel 82 of the input image data 102 based on a multi-dimensional correction table 104. In certain embodiments, the correction table 104 may include a digital offset value for each pixel 82 of the display 26. The correction table 104 may be organized according to the location (e.g., x-y coordinates) of the pixel 82, as provided by the input image data 102. As such, the correction table 104 may serve as a two-dimensional lookup table (LUT) for the compensation system 30 to provide digital offset values for each pixel 82 based on the location of each pixel 82. As discussed above, the digital offset values may compensate for various characteristics of the display 26 that may cause the pixels 82 of the display 26 to output non-uniform color and/or luminance properties when provided similar electrical inputs.

In one embodiment, the correction table 104 may be generated during a manufacturing stage of the electronic device 10, the display 26, or the like. In any case, the pixels 82 may be subjected to various types of testing procedures that measure the luminance differences across the display 26 for various test images. The testing procedure may include providing various gray level inputs for each pixel 82 for the various test images. The testing procedure may include measuring an optical wave output by the pixels 82 when depicting various test images, measuring emission current values for each pixel 82 associated with different gray levels, and the like. Based on the results of these tests, digital offset values may be determined for each pixel 82 under various conditions (e.g., gray level, luminance setting, pixel driving mode, refresh rate, emission time, display panel timing). The digital offset values for the pixels 82 of the display 26 may cause the pixels 82 to output substantially similar luminance values when receiving substantially similar electrical inputs. In one embodiment, the digital offset values may be stored in the memory 18 or other similar component within the electronic device 10, such that the compensation system 30 may access the memory 18 and adjust the pixel data of the input image data 102 to provide more uniform colors and luminance across the display 26.

Although the foregoing description of the correction table 104 is described as a lookup table with respect to pixel location, it should be noted that the correction table may include a number of other dimensions, such as luminance setting, refresh rate, pixel driving mode, and the like. Accordingly, the testing procedures described above may include additional processes that measure the pixels 82 response to these other variables.

It should be noted that, in some embodiments, instead of a collection of offset values, the correction table 104 may include a gain map that that provides a gain factor for each pixel 82. The gain map may be generated based on the testing procedure described above.

In addition to the correction table 104, the compensation system 30 may include a scale factor computation block 106. The scale factor computation block 106 may determine a scale factor to apply to the digital offset values provided by the correction table 104. The scale factor may account for different (e.g., non-linear) performance properties of the display 26. For instance, different portions of pixels 82 within the display 26 may exhibit different luminance properties based on the pixel driving scheme, the refresh rate employed by the display 26, the emission times used by the pixels 82, the luminance setting of the display, and the like. To account for these properties, the scale factor computation block 106 may acquire a scale factor to apply to the digital offset value via a scale factor table 108. In certain embodiments, the scale factor table 108 may be a multi-dimensional lookup table (LUT) having a number of scaling factors organized according to various pixel and display properties.

Like the correction table 104 described above, the scale factor table 108 may be generated during a manufacturing phase of the electronic device 10, the display 26, or the like. In one embodiment, during manufacturing of the display 26, a gamma capture is performed and saved in the memory 18 or other suitable device. The gamma capture may be performed, in some embodiments, for various luminance settings, gray levels, driving modes, and the like. The data for the scale factor table 108 may be determined based on this gamma capture. As such, the scale factor table 108 may be determined based on information available from a gamma block associated with the display. This gamma block provides information related to a gamma response curve (e.g., used to color tune the display 26) for the pixels 82 of the display 26. The gamma response curve may vary between each display 26, between each display manufacturer, and the like. By generating the scale factor table 108 using the gamma capture data, the scale factor computation block 106 may account for non-linear characteristics of each pixel 82 of a respective display 26, as compared to other displays 26.

Moreover, the scale factor table 108 may provide scaling factors for each pixel 82 of the display 26 to provide to compensate for the effects to the pixels 82 due to these non-linear characteristics, and thus provide a more uniform output of light. Indeed, the scale factor 108 may assist in compensating for non-uniform color and luminance properties of the pixels 82 when the pixels 82 are provided with various gray levels, operating under different luminance settings, or using different driving modes. That is, the display 26 may operate using a low refresh rate (e.g., 30-60 Hz), a high refresh rate (e.g., greater than 60 Hz), different timing signal waves, different voltage driving values for pixels 82, and the like. By applying a respective scale factor to a respective digital offset value associated with a respective pixel based on these variables, as provided by the correction table 104, the resulting scaled digital offset value may compensate for the non-uniform output characteristics of the respective pixel 82.

As briefly mentioned above, the scale factor table 108 may be a multi-dimensional table that provides a scaling factor for each digital offset value provided by the correction table 104. In one embodiment, the scale factor table 108 may be organized according to a location of the pixel 82 as provided by the input image data 102, a luminance setting 110, a driving mode 112, a gray level input 113 provided to the pixels, and other suitable variables.

In some scenarios, the scale factor table 108 may not include a respective scale factor for a particular pixel 82. In this instance, the scale factor computation block 106 may interpolate a scaling factor based on existing scale factors provided by the scale factor table 108 for pixels 82 having closely related properties to the respective pixel 82. For instance, based on the properties of the respective pixel 82, the scale factor computation block 106 may identify a number of scale factor values for pixels 82 in the scale factor table 108 that would neighbor the scale factor value for the respective pixel 82 if it existed in the scale factor table 108. The scale factor computation block 106 may then interpolate a scale factor for the respective pixel 82 based on the scale factors of the pixels 82 that neighbor the respective pixel 82. By way of example, the scale factor computation block 106 may determine an average scale factor value of the scale factor values for the neighboring pixels. The average scale factor value may then be used as the respective scale factor for the respective pixel 82.

Referring back to the data flow diagram 100 of FIG. 7, after the compensation system 30 determines the digital offset value via the correction table 104 and the scale factor value via the scale factor computation block 106, the compensation system 30 may determine a product of these two values. The resulting scaled digital offset value for each pixel 82 of the input image data 102 may then be provided to a post-processing block 114.

Figure 8:
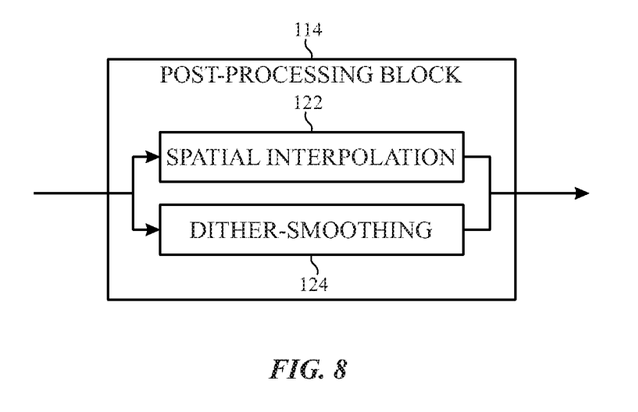
FIG. 8 is a block diagram of a post processing block for generating compensated image data for display by the electronic device of FIG. 1, in accordance with embodiments described herein.
Figure 9:
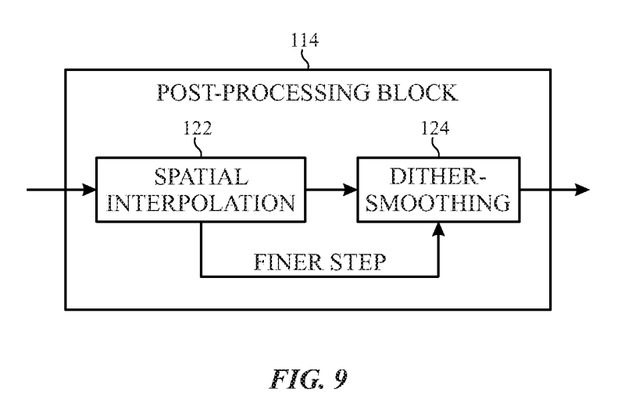
FIG. 9 is a block diagram of a post processing block for generating compensated image data for display by the electronic device of FIG. 1, in accordance with embodiments described herein.
Figure 10:
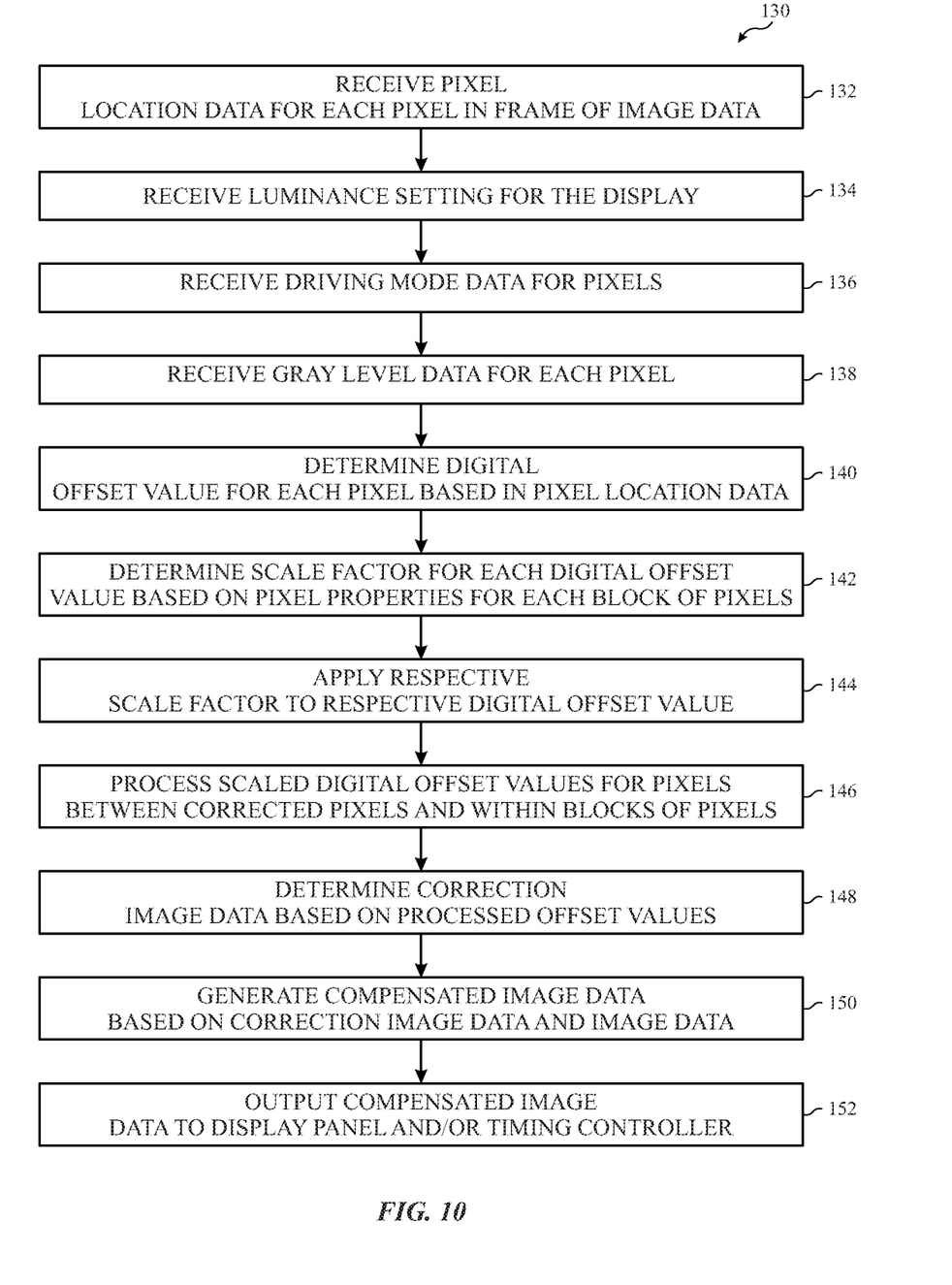
FIG. 10 is a flow chart of a method for compensating the pixel data of input image data to provide more uniform pixel characteristics across the display of the electronic device of FIG. 1, in accordance with embodiments described herein.

Referring briefly to FIGS. 8 and 9, the post-processing block 114 may include a spatial interpolation block 122 and a dither-smoothing block 124. In certain embodiments, the correction table 104 and the scale factor table 108 may include digital offset values and scale factor values for an array or block (e.g., 2x2, 3x3, 4x4) of pixels 82. As such, the correction table 104 and the scale factor table 108 may store the digital offset values and the scale factor values for low-resolution image data to reduce the amount of storage space used within the electronic device 10. In this embodiment, the post-processing block 114 may establish sub-gray level compensation accuracy to smooth the pixel data within the blocks of pixels 82 via the dither-smoothing block and/or between the blocks of pixels 82 via the spatial interpolation block.

It should be noted, that the spatial interpolation block 122 may also perform extrapolation for pixels 82 located at the edge of the display 26 towards the respective pixel 82. As such, the spatial interpolation block 122 may assist in smoothing the image depicted at the edge of the display 26. It should also be noted that the spatial interpolation block 122 and the dither-smoothing block 124 may be performed in parallel, as illustrated in FIG. 8, or in series, as illustrated in FIG. 9.

Referring back to FIG. 7, the post-processing block 114 may be positioned at various locations within the logic of the compensation system 30. For instance, the post-processing block 114 may be positioned to receive the product of the scale factor and the digital offset value. In this case, after the scaled digital values for each pixel 82 or each block of pixels 82 are determined, the post-processing block 114 may smooth or refine the pixels 82 within the block of pixels 82 and/or between the block of pixels 82 to decrease visual artifacts that may be caused by adding the scaled digital offset values to the input image data 102. After processing the scaled digital offset values, the post-processing block 114 may output correction image data that includes the smoothed and scaled digital offset values for each pixel 82 of the display.

The compensation system 30 may then add the correction image data to the input image data 102 to generate compensated image data 116. The compensated image data 116 may be provided to the controller 84 or other image-processing component that may use the compensated image data 116 to cause the pixels 82 to display the image of the compensated image data 116. The resulting image depicted on the display 26 may depict luminance levels for each pixel 82 of the display 26 more uniformly, as compared to the pixels 82 driven using the original input image data 102.

In another embodiment, the post-processing block 114 may be positioned to receive the sum of the scaled digital offset values and the input image data 102. That is, the scaled digital offset values may be added to the input image data 102, and the resulting sum may be processed for smoothing by the post-processing block 114. In yet another embodiment, two post-processing blocks 114 may be employed by the compensation system 30 to provide layers of smoothing for the resulting compensated image data 116.

With the foregoing in mind, FIG. 8 illustrates a flow chart of a method 130 for adaptively compensating the input image data 102 for non-uniform color and luminance properties of the pixels 82 of the display 26. The following description of the method 130 will be described as being performed by the compensation system 30, but it should be understood that the process described herein may be performed by any suitable processor(s) that processes image data for display via the pixels 82. In addition, although the method 130 is described in a particular order, is should be understood that the method 130 may be performed in any suitable order.

Referring now to FIG. 8, at block 132, the compensation system 30 may receive pixel location data (e.g., Cartesian coordinates) for each pixel 82 based on the input image data 102 (e.g., frame of image data). In one embodiment, the location of each pixel 82 may be used to identify a certain block of pixels 82 that corresponds to each respective pixel 82. The identified blocks may later be used to determine a digital offset value and/or a scale factor from the correction table 104 and/or the scale factor table 108.

At block 134, the compensation system 30 may receive a luminance setting for the display 26, and, at block 136, the compensation system 30 may receive driving mode data for the pixels 82. As discussed above, the driving mode data may detail a refresh rate employed by the display 26, a type of timing signal employed by the timing controller 84, a manner in which the pixels 82 are driven (e.g., current-based, voltage-based), and the like. In addition, at block 138, the compensation system 30 may receive a gray level for each pixel 82 of the input image data 102.

After receiving these inputs, at block 142, the compensation system 30 may determine a digital offset value for each pixel 82 based on the pixel location data using the correction table 104. As discussed above, the correction table 104 may be a two-dimensional table organized with respect to the x and y coordinates of pixels 82 in the display 26. In some embodiments, the correction table 104 may include additional dimensions related to the luminance setting of the display 26, the driving mode of the pixels 82, and the like. By way of example, the correction table 104 may be a three-dimensional table that provides digital offset values for pixels 82 based on the pixel location and the luminance setting. It should be noted that although the correction table 104 is described as two-dimensional or a three-dimensional table, the correction table 104 may be any suitable type of multi-dimensional table that organizes digital offset values with respect to various properties of the display 26 or the pixel 82.

At block 142, the compensation system 30 may determine a scale factor for each digital offset value determined at block 140. The scale factor may be acquired from the scale factor table 108 based on the driving mode data and the pixel location data. In some embodiments, the scale factor table 108 may be organized with respect to other variables, such as the luminance setting, the gray level, and the like. In any case, the compensation system 30 may identify a scale factor for each pixel 82 of the image data based on the various properties depending on the number of variables accounted for by the scale factor table 108.

In one embodiment, a scale factor directly associated with a respective pixel 82 may not be provided via the scale factor table 108. In this case, the compensation system 30 may interpolate and/or extrapolate a scale factor value for the respective pixel 82 based on scale factor values associated with pixels 82 that neighbor the respective pixel 82. By way of example, the scale factor table 108 may be organized with respect to luminance settings and gray level tabs of a gray level resistor ladder. Based on the gray level data associated with a respective pixel 82, the compensation system 30 may determine a respective gray level that is used to output the respective gray level. The compensation system 30 may then use the identified gray level tab and the luminance setting of the display to identify a respective scale factor for the respective pixel via the scale factor table 108. If the respective gray level tab and/or the respective luminance setting is not provided via the scale factor table 108, the compensation system 30 may interpolate a scale factor using the scale factors provided in the scale factor table 108 for neighboring gray level tabs and/or luminance values.

After determining the scale factor for each pixel 82, at block 144, the compensation system 30 may apply the respective scale factor determined at block 142 to a respective digital offset value determined at block 140. That is, the compensation system 30 may determine a product of the respective scale factor determined at block 142 and the respective digital offset value determined at block 140 for each pixel 82 of the input image data 102.

Using the scaled digital offset values for the pixels 82 of the input image data 102, at block 146, the compensation system 30 may process digital offset values for pixels 82 to smooth the transition between the corrected pixels 82 associated with the scaled digital offset values determined at block 144. That is, the compensation system 30 may determine digital offset values for pixels 82 between the corrected pixels 82 to smooth the transition between the sets of corrected pixels 82.

In one embodiment, the scale factor table 108 may be organized with respect to arrays or blocks of pixels 82. That is, one scale factor value may be provided for pixels 82 that may be part of some block of pixels 82 depending on the location of pixels 82 to preserve storage space on the electronic device 10. In this case, at block 148, the compensation system 30 may interpolate digital offset values for the pixels located at the edges of these blocks of pixels 82 to ensure that the transitions between the blocks of pixels 82 are smooth. In addition, the compensation system 30 may dither or smooth the block of pixels 82 to reduce the likelihood of visual artifacts from being depicted on the display 26.

At block 148, the compensation system 30 may determine correction image data based on the scaled digital offset values determined at block 144 and the processed digital offset values determined at block 146. The correction image data may include a collection of digital offset values for pixels 82 of the image data 102 that, when added to the original pixel values, causes the pixels 82 of the display to react uniformly with respect to similar inputs.

The compensation system 30 may then generate the compensated image data 116 based on the sum of the correction image data determined at block 148 and the input image data 102. In one embodiment, if the correction table 104 included a gain map, the compensation system 30 may generate the compensated image data 116 based on the product of the correction image data determined at block 148 and the input image data 102. In any case, the correction image data may adjust the pixel values of the input image data 102 to cause the pixels 82 to have more uniform luminance properties. After generating the compensated image data 116, the compensation system 30 may transmit the compensated image data 116 to the controller 84, the pixels 82, or any other suitable component to display the desired image via the display 26.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A display device, comprising:
   a display comprising a plurality of pixels; and
   a processor configured to:
      receive image data configured to be displayed via the plurality of pixels;
      determine at least one digital offset value for at least one pixel of the plurality of pixels based on at least one location of the at least one pixel with respect to the plurality of pixels of the display, wherein the at least one digital offset value is configured to compensate for one or more non-uniformity properties of the at least one pixel, and wherein the at least one digital offset value is acquired via a first multi-dimensional lookup table organized according to a plurality of location coordinates of at least a portion of the plurality of pixels;
      determine at least one scale factor associated with the at least one pixel based on at least two of a luminance setting associated with the display, a driving mode associated with the display, and at least one gray level value for the at least one pixel, wherein the at least one gray level is acquired via the image data, and wherein the at least one scale factor is acquired via a second multi-dimensional lookup table organized according to the at least two of the luminance setting associated with the display, the driving mode associated with the display, and the at least one gray level value for the at least one pixel;
      generate correction image data by applying the at least one scale factor to the at least one digital offset value;
      generate compensated image data based on the correction image data and the image data; and
      provide the compensated image data to the display.

2. The display device of claim 1, wherein the processor is configured to generate the compensated image data by smoothing a sum of the correction image data and the image data.

3. The display device of claim 1, wherein the processor is configured to generate the correction image data by smoothing a product of the at least one scale factor and the at least one digital offset value.

4. The display device of claim 3, wherein the processor is configured to smooth the product of the at least one scale factor and the at least digital offset value using spatial interpolation.

5. The display device of claim 3, wherein the processor is configured to smooth the product of the at least one scale factor and the at least digital offset value using dither smoothing.

6. A method for compensating one or more pixels of a plurality of pixels in a display, comprising:
   receiving image data configured to be displayed via the plurality of pixels;
   determining one or more digital offset values for the one or more pixels based on one or more locations with respect to the one or more pixels of the display, wherein the one or more digital offset values are configured to compensate for one or more non-uniformity properties of the one or more pixels, wherein the one or more digital offset values are acquired via a first multi-dimensional lookup table organized according to a plurality of location coordinates of at least a portion of the plurality of pixels;
   determining one or more scale factors associated with the one or more pixels based on a luminance setting associated with the display and one or more one gray level values for the one or more pixels, wherein the one or more gray level values is acquired via the image data, and wherein the one or more scale factors are acquired via a second multi-dimensional lookup table organized according to the luminance setting associated with the display and the one or more gray level values;
   generating correction image data by applying the one or more scale factors to the one or more digital offset values;
   generating compensated image data based on the correction image data and the image data; and
   providing the compensated image data to the one or more pixels.

7. The method of claim 6, the one or more scale factors are interpolated based on a set of scale factors associated with a set of pixels neighboring the one or more pixels and the second multi-dimensional lookup table.

8. The method of claim 6, wherein the one or more digital offset values for the one or more pixels are determined based on the one or more locations of the one or more pixels, the luminance setting, and the first multi-dimensional lookup table.

9. The method of claim 6, wherein the one or more scale factors are determined based on at least two of: the luminance setting, a driving mode associated with the display, and the one or more gray level values, a refresh rate of the display, a display panel timing, and an emission time.

10. The method of claim 9, wherein the first multi-dimensional table is generated during a manufacturing phase of the display.

11. The method of claim 9, wherein the first multi-dimensional table is generated based on one or more luminance differences among the one or more pixels when provided an electrical input.

12. The method of claim 9, wherein the first multi-dimensional table is generated based on one or more optical wave tests configured to determine one or more luminance differences among the one or more pixels when provided an electrical input.

13. The method of claim 6, wherein the second multi-dimensional table is determined by:
    determining one or more gray level tabs associated with the one or more gray level values; and
    interpolating the one or more scale factors based on a set of scale factors associated with the one or more gray level tabs.

14. The method of claim 6, wherein the second multi-dimensional table is determined based on information from a gamma block associated with the display.

15. A non-transitory computer-readable medium comprising computer-executable instructions configured to cause a processor to:
    receive image data configured to be displayed via a plurality of pixels of a display;
    determine one or more digital offset values for one or more pixels of the plurality of pixels based on one or more locations with respect to the one or more pixels of the display, wherein the one or more digital offset values are configured to compensate for one or more non-uniformity properties of the one or more pixels, and wherein the one or more digital offset values are acquired via a first multi-dimensional lookup table organized according to a plurality of location coordinates of at least a portion of the plurality of pixels;
    determine one or more scale factors associated with the one or more pixels based on a luminance setting associated with the display and one or more one gray level values for the one or more pixels, wherein the one or more gray levels is acquired via the image data, and wherein the one or more scale factors are acquired via a second multi-dimensional lookup table organized according to the luminance setting associated with the display and the one or more gray level values;
    generate correction image data by applying the one or more scale factors to the one or more digital offset values;
    generate compensated image data based on the correction image data and the image data; and
    provide the compensated image data to the one or more pixels via a timing controller.

* * * * *